Figure 1:
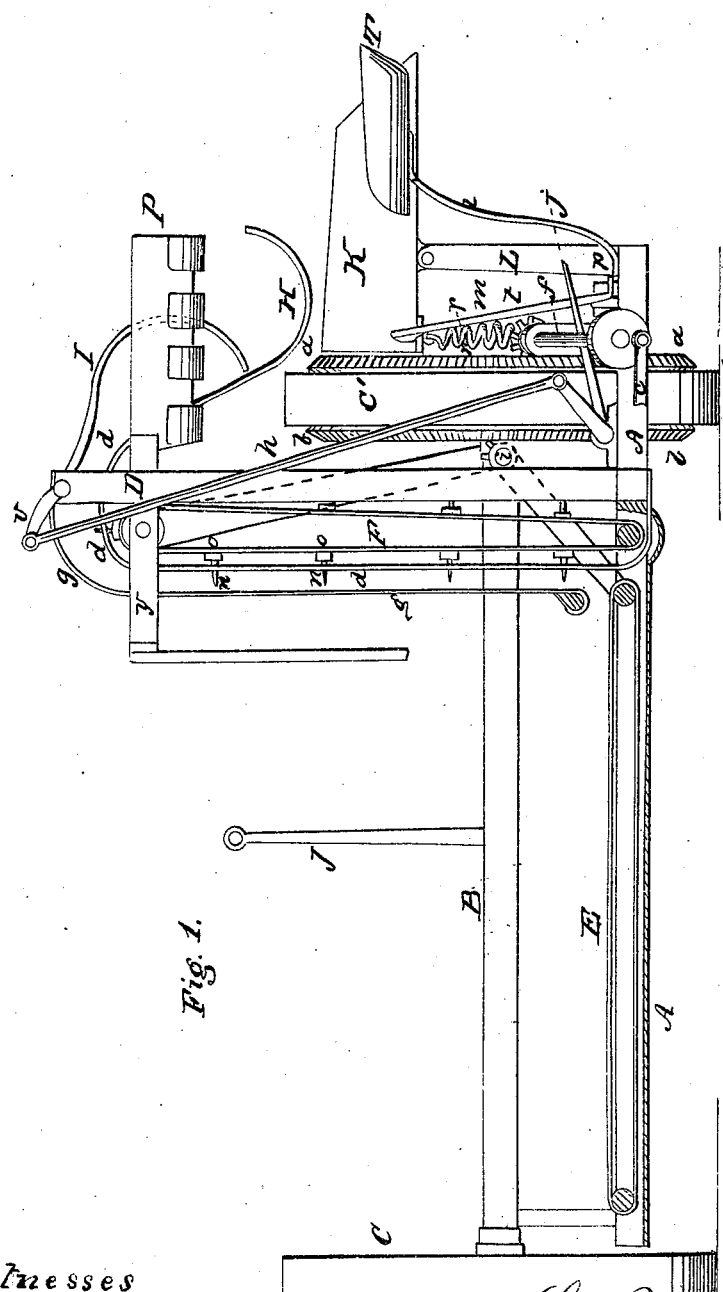

Sheet 2. 2 Sheets.
L. B. Stilson.
Grain Binder.
No. 99968. Patented Feb. 15. 1870.
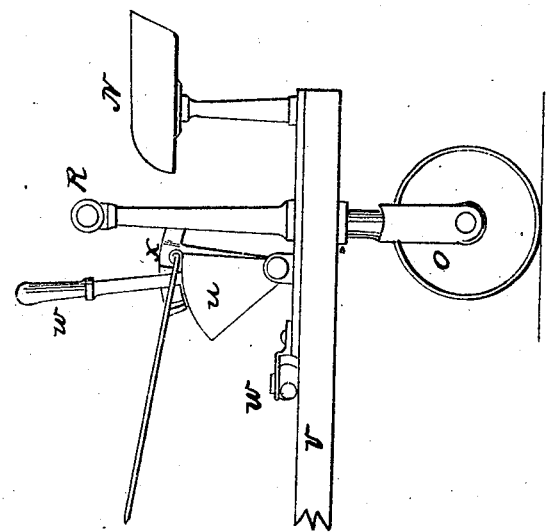
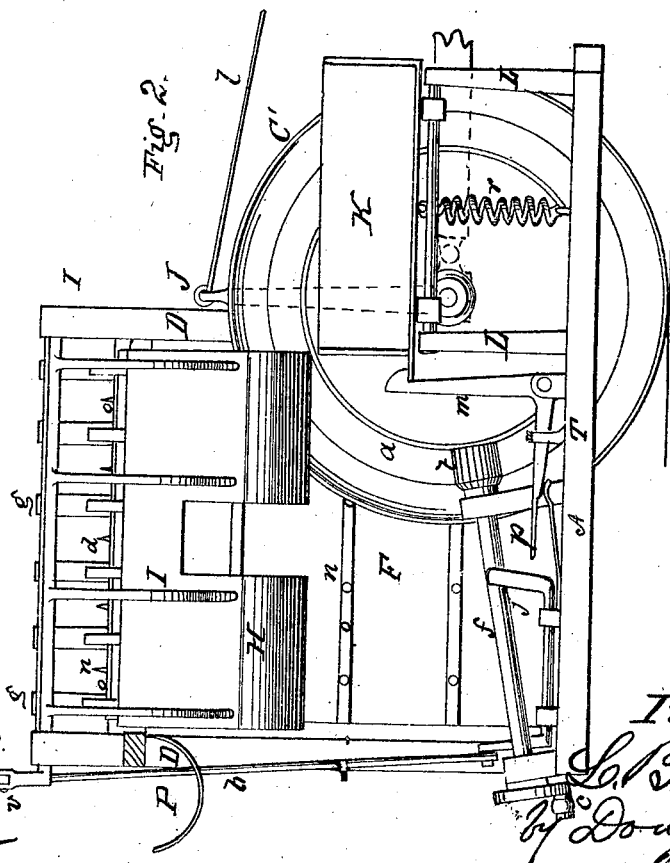
Fig. 2.
Witnesses.
P. T. Dodge
L. Hailer
Inventor.
L. B. Stilson
by Dodge & Munn
his Attys.

UNITED STATES PATENT OFFICE.

LYMAN B. STILSON, OF MINNEAPOLIS, MINNESOTA, ASSIGNOR TO HIMSELF AND JOHN W. CHILDS, OF SAME PLACE.

IMPROVEMENT IN GRAIN HARVESTERS AND BINDERS.

Specification forming part of Letters Patent No. 99,968, dated February 15, 1870; antedated February 6, 1870.

*To all whom it may concern:*

Be it known that I, LYMAN B. STILSON, of Minneapolis, in the county of Hennepin and State of Minnesota, have invented certain new and useful Improvements in Grain-Harvesters; and I do hereby declare that the following is a full, clear, and exact description thereof, reference being had to the accompanying drawings, making part of this specification, and to the letters of reference marked thereon—like letters indicating like parts, wherever they occur.

To enable others skilled in the art to construct and use my invention, I will proceed to describe it.

My invention relates to harvesters; and the invention consists in the manner of constructing and arranging the various parts, whereby it is adapted more especially to the purpose of having the grain bound thereon, and gathered into heaps for shocks.

In the drawings, Figure 1 is a front elevation, with the cutting apparatus removed, for the purpose of showing the endless apron on the platform. Fig. 2 is a side elevation of the same.

My machine belongs to that class which have the team placed behind. In constructing it I provide a rectangular frame, A, and suspend this frame by suitable supports from an axle, B, having a wheel at each end. One of these wheels, C′, is the driving-wheel, and is provided on each face or side with a circle of bevel-gear teeth, *a* and *b*, as shown in Fig. 1. The outer circle *a* operates a shaft, *f*, by means of a pinion, *t*, secured on said shaft, which latter has its bearings in suitable supports on the frame outside of the wheel C′—this shaft *f* projecting forward even with the front edge of the platform, where it is connected by a crank and pitman, *c*, with the sickle, which is of the usual character. In practice I make my driving-wheel nearly four feet in diameter, in order to impart to the sickle the requisite speed, and it may be made even larger, if required.

Upon the frame A, near the inner face of the wheel C′, I erect a vertical frame, D, and attach it rigidly in position. Near the top of this frame D, in cross-arms *y*, I mount a roller, with a corresponding roller in the frame A below, and around them pass an endless apron, F, upon the outer face of which is secured transversely a series of slats, *o*, with teeth *n* projecting from their face, as shown in Fig. 1. In front of this apron I secure a series of vertical strips of metal, *d*, so arranged that the teeth *n* of the slats shall protrude more or less through the spaces left between the adjoining strips *d*, as represented in the drawing. At the top these strips *d* pass back over the top of the apron, and are attached to a trough or hopper, H, the curve of the strips *d*, where they pass back of the upper roller, being made eccentric to the roller, so that as the teeth on the apron pass over behind the roller, they will be gradually withdrawn from between the strips *d*, and thereby release their hold on the straw or grain, and permit the latter to fall down into the trough H.

In front of the strips *d* I secure still another set of strips, *g*, their upper ends being secured rigidly to the top bar of frame D, their lower ends being united by a rod, and left free, so that they may yield slightly to pressure—these strips or rods *g* being made of material that will spring more or less.

Upon the top of frame D I secure a rock-shaft, to which is rigidly attached a series of curved arms, I, the lower ends of which rest upon the upper portion of the trough H, as shown in Fig. 1. To one end of the rock-shaft is attached an arm, *v*, which is connected by a rod, *h*, to a foot-lever, J, on the frame outside of the wheel C′ in proper position to be operated by a person sitting on a seat, T, located there, as shown in Fig. 1. To the right of this seat, on a couple of standards, L, is pivoted a table or receptacle, K, for receiving the bundles of grain when bound. This table is so arranged that it will tip automatically by the weight of the bundles when released; and it has attached to it a spring, *r*, to bring it back to its horizontal position when the grain is dumped. A spring-catch, *m*, as represented more clearly in Fig. 1, is pivoted to the frame in such a manner as to hold the table K in position while being filled, and be readily operated by the foot of the attendant when it is desired to release it for dumping the grain.

The platform is covered by an endless apron, E, passing around suitable rollers at each side, as shown in Fig. 1. Motion is transmitted to this apron, and also to the apron F, from a short shaft, $i$, having a pinion on it engaging with the bevel-gear $b$ on the inside face of wheel $C'$—the motion being communicated by means of belts or cords, shown in red lines in Fig. 1.

A rack, P, is secured to the upright frame D at the left hand of the person who is to occupy the seat T, and who is to perform the labor of binding the grain, as hereinafter explained, this rack P being for the purpose of holding the ties used in binding, which said tie forms the subject of a separate application filed herewith.

For the purpose of propelling and guiding the machine, I hinge to the rear side of the axle a tongue or frame, V, which, in this case, is formed of two bars united at their rear end, and separated at their front end, so as to form a V-shaped frame. At the extreme rear end, there is mounted upon it a small platform, on which is mounted a seat, N, as represented in Fig. 2. A caster-wheel, O, supports this rear end, and has its stem passing up through a suitable bearing, with a cross-bar or handle, R, at its upper end in proper position to be readily grasped and operated by the operator on seat N. The team is attached by whiffle-trees secured to the frame or tongue V, as shown at W, Fig. 2, the animals being on opposite sides of the tongue, and having their heads tied to the front part of the tongue to keep them in place.

By turning the caster-wheel O, the machine can be guided as desired, the team following, and being guided by its movements without the use of the reins, thus leaving the operator free to give his attention to the proper manipulation of the steering-wheel.

To regulate the height of the cut I attach to the axle B an upright arm or lever, J, which is connected by a rod or chain, $l$, to a segmental plate, $u$, which is pivoted upon the rear platform to the right, and within reach of the operator sitting on seat N, as shown in Fig. 2. To this plate $u$ I secure a spring-lever, $w$, which engages in notches on the adjoining face of a rack, $x$, secured rigidly by its side. By drawing the lever $w$ back the front end of the machine, with its sickle, is elevated, and secured in position by the lever $w$, and by reversing the movement of the lever the sickle is lowered.

The operation of my machine is as follows: Being set in motion, the grain is cut, and falls upon the apron E, by which it is carried across the platform to the foot of apron F, the teeth $m$ of which, seizing it, carry it up between the face of strips $d$ and the spring bars or strips $g$, and over onto the upper part of trough H, where it accumulates, and is held by the cut-off I. As soon as a sufficient quantity has been thus accumulated for a bundle the binder, sitting on seat T, raises the cut-off by pressing his foot on the treadle $j$, which allows the grain thus accumulated to drop down into the trough H, when the binder immediately passes around it one of the ties heretofore mentioned, and of which a supply is kept conveniently arranged in the rack P. For convenience in passing the tie around the bundle, an opening is made at the center of the trough M, as shown in Fig. 2. The bundle when tied is placed on the tilting table K, where it remains until enough are accumulated thereon to form one-half a shock, (a shock usually consisting of ten or a dozen bundles,) when the operator, by pressing his foot on the lever $p$, releases the table, which, being pivoted eccentrically, is tipped by the weight of the bundles, and they are deposited in a heap on the ground. At the next round another heap of the same number is deposited directly opposite to this heap, and thus there are accumulated at each such point the requisite number to form an entire shock, with space enough between the two deposits to conveniently erect the shock. Thus all labor of gathering the sheaves by hand is entirely dispensed with.

By this method of constructing a machine, I am enabled to produce an apparatus that is extremely simple, light, and, consequently, cheap, there being only the two circles of gear on the driving-wheel, and two pinions in the entire machine. It is provided with the ordinary reel, which may be driven from the other bearing-wheel by a cord in the usual manner.

With the machine thus made, I find that a good team of two horses and two men are able to operate the machine, and perform all the labor of cutting, binding, and carrying together the grain on a space six feet wide.

I am aware that harvesting-machines have heretofore been made in which endless aprons were used for conveying the cut grain, and gathering it into bundles; and also that machines have been made to be propelled by a team placed behind the same, and therefore I do not claim, broadly, such as my invention; but

Having thus described my improved harvester, what I claim as my invention, and desire to secure by Letters Patent, is—

1. The combination of the apron F, provided with the teeth $n$, the stationary strips or rods $d$, and the spring strips or rods $g$, when arranged to operate substantially as described.

2. The combination and arrangement of the foot-lever $j$, rod $h$, and arm $v$, for operating the cut-off by the foot of the binder, substantially as described.

3. The combination of the eccentrically-pivoted table K, spring $r$, and catch $m$, with foot-lever $p$ attached, all arranged to operate substantially as described.

4. The combination of the main frame A, suspended from the axle B, the latter provided with the lever J, the rod $l$, hinged segment $u$ with its lever $w$, and rack $r$ mounted on the frame V, and all arranged as described.

LYMAN B. STILSON.

Witnesses:
J. McKENNEY,
W. C. DODGE.